(12) United States Patent
Fujimura et al.

(10) Patent No.: US 11,854,709 B2
(45) Date of Patent: Dec. 26, 2023

(54) FAST REACTOR WITH PRIMARY AND BACKUP CONTROL RODS

(71) Applicant: Hitachi-GE Nuclear Energy, Ltd., Hitachi (JP)

(72) Inventors: Koji Fujimura, Hitachi (JP); Kazuhiro Fujimata, Hitachi (JP); Sho Fuchita, Hitachi (JP); Junichi Miwa, Hitachi (JP)

(73) Assignee: Hitachi-GE Nuclear Energy, Ltd., Hitachi (JP)

( * ) Notice: Subject to any disclaimer, the term of this patent is extended or adjusted under 35 U.S.C. 154(b) by 0 days.

(21) Appl. No.: 17/185,009

(22) Filed: Feb. 25, 2021

(65) Prior Publication Data
US 2021/0287811 A1  Sep. 16, 2021

(30) Foreign Application Priority Data
Feb. 28, 2020 (JP) .................. 2020-033566

(51) Int. Cl.
*G21C 1/02* (2006.01)
*G21C 1/03* (2006.01)
*G21C 3/28* (2006.01)
*G21C 7/28* (2006.01)
*G21C 7/32* (2006.01)
*G21C 7/08* (2006.01)

(52) U.S. Cl.
CPC .............. *G21C 1/02* (2013.01); *G21C 1/03* (2013.01); *G21C 3/28* (2013.01); *G21C 1/024* (2013.01); *G21C 7/08* (2013.01); *G21C 7/28* (2013.01); *G21C 7/32* (2013.01)

(58) Field of Classification Search
CPC ..... G21C 1/02; G21C 7/08; G21C 7/28; G21C 1/03; G21C 3/32; G21C 3/28; G21C 4/32
USPC ........................................................ 376/219
See application file for complete search history.

(56) References Cited

U.S. PATENT DOCUMENTS

| | | | | |
|---|---|---|---|---|
| 4,655,989 A | * | 4/1987 | Kawashima | ........... G21C 1/024 376/173 |
| 4,762,672 A | * | 8/1988 | Kurihara | ................ G21C 7/103 376/334 |
| 4,880,596 A | | 11/1989 | Barrus et al. | |

FOREIGN PATENT DOCUMENTS

| | | |
|---|---|---|
| JP | 61-129593 A | 6/1986 |
| JP | 3-243891 A | 10/1991 |
| JP | 2016-85118 A | 5/2016 |

OTHER PUBLICATIONS

Fuchita et al., "Development of Inherent Safety Fast Reactor by Using Blanket Bearing Minor Actinides (8) Survey for Achieving Low Void Reactivity", Convention of the Autumn of Atomic Energy Society of Japan 2019 Lecture Summary, Sep. 12, 2019, 2J19, (one (1) page).

(Continued)

*Primary Examiner* — Jack W Keith
*Assistant Examiner* — Daniel Wasil
(74) *Attorney, Agent, or Firm* — Crowell & Moring LLP

(57) ABSTRACT

A fast reactor core includes a sodium plenum installed above the fuel. The sodium plenum is capable of reducing a void reactivity. During operation, a tip of a primary control rod is inserted in a core fuel region, and a tip of a backup control rod is arranged near an upper end of the sodium plenum.

4 Claims, 8 Drawing Sheets

(56) References Cited

OTHER PUBLICATIONS

Takeda et al., "Effect of void propagation to void reactivity in Fast Reactors with Sodium Plenum", Spring of Atomic Energy Society of Japan 2017 A Lecture Summary, Mar. 29, 2017, 3F09, (one (1) page).
Japanese-language Office Action issued in Japanese Application No. 2020-033566 dated Feb. 14, 2023 with English translation (five (5) pages).

* cited by examiner

FAST REACTOR WITH PRIMARY AND BACKUP CONTROL RODS

CLAIM OF PRIORITY

The present application claims priority from Japanese Patent application serial no. 2020-033566, filed on Feb. 28, 2020, the content of which is hereby incorporated by reference into this application.

BACKGROUND OF THE INVENTION

1. Field of the Invention

The present invention relates to a structure of a nuclear reactor and a control method thereof, and particularly to a technique effective for application to a fast reactor.

2. Description of the Related Art

Generally, in a fast breeder reactor, a core is arranged in a reactor vessel, and the reactor vessel is filled with liquid sodium as a coolant. A fuel assembly loaded in the core includes a plurality of fuel rods filled with depleted uranium (U-238) and enriched with plutonium (Pu), a wrapper tube surrounding the bundled plurality of fuel rods, entrance nozzles that support neutron shields located at lower ends of the fuel rods and below the fuel rods, and a coolant outflow portion located above the fuel rods.

The core of the fast breeder reactor has a core fuel region having an inner core region and an outer core region surrounding the inner core region, a blanket fuel region surrounding the core fuel region, and a shield region surrounding the blanket region. In a case of a standard homogeneous core, a Pu enrichment of the fuel assembly loaded in the outer core region is higher than a Pu enrichment of the fuel assembly loaded in the inner core region. As a result, a power density distribution in a radial direction of the core is flattened.

Forms of a nuclear fuel material to be housed in each fuel rod of the fuel assembly include a metal fuel, a nitride fuel, and an oxide fuel. Of these, the oxide fuel has the most abundant achievement.

The fuel rods are filled with a mixed oxide fuel in which oxides of Pu and the depleted uranium are mixed, that is, pellets of a MOX fuel, at a height of about 80 cm to 100 cm at a central portion in an axial direction. Further, in the fuel rods, an axial blanket region filled with a plurality of uranium dioxide pellets made of the depleted uranium is arranged above and below a MOX fuel filled region.

An inner core fuel assembly loaded in the inner core region and an outer core fuel assembly loaded in the outer core region includes a plurality of fuel rods filled with a plurality of pellets of MOX fuels as described above. Further, the Pu enrichment of the outer core fuel assembly is higher than that of the inner core fuel assembly.

The blanket fuel region surrounding the core fuel region is loaded with a blanket fuel assembly including a plurality of fuel rods filled with a plurality of uranium dioxide pellets made of the depleted uranium. Among neutrons generated by a fission reaction that occurs in the fuel assembly loaded in the core fuel region, the neutrons that leak from the core fuel region are absorbed by the depleted uranium (U-238) in each fuel rod of the blanket fuel assembly loaded in the blanket fuel region. As a result, a new fissile nuclide, Pu-239, is generated in each fuel rod of the blanket fuel assembly.

In addition, control rods are used when starting up and shutting down the fast breeder reactor and when adjusting a nuclear reactor power. Each of the control rods includes a plurality of neutron absorbing rods with boron carbide ($B_4C$) pellets encapsulated in a stainless steel cladding, and the neutron absorbing rods are housed in the wrapper tube having a regular hexagonal cross section in the same manner as the inner core fuel assembly and the outer core fuel assembly.

The control rods include control rods of two independent systems, that is, a primary control rod and a backup control rod. The primary control rod is used for changing a reactivity associated with burnup and adjusting the power density distribution. The backup control rod is installed for backup in case the primary control rod fails. It is possible to perform a scram of the fast breeder reactor simply by any one system of the primary control rod and the backup control rod.

Generally, a void reactivity in the core fuel region of a fast reactor is positive, and assuming that a primary cooling system pump stops due to a loss of an external power supply and the scram fails at the same time, a temperature of the coolant may rise, which leads to a core damage. As a passive countermeasure, a self-actuated reactor shutdown system (SASS) is considered in which when a temperature of a coolant outlet rises, a magnetic force for holding the control rods is lost and the control rods automatically falls to shut down the nuclear reactor.

In addition, a core with sodium plenum, which consists only of a wrapper tube and flowing sodium above a core fuel of a fast reactor and includes no fuel rod bundles, is considered. For example, in JP-A-2016-085118, in a core of a fast reactor with a sodium plenum, a volume ratio of a structural material in a sodium plenum region is reduced by changing a spring used in an upper gas plenum of a fuel rod from a coil spring to a disc spring, thereby reducing a void reactivity. This is because the smaller the proportion of the structural materials, the lower the probability that the neutrons are scattered by Fe or the like and absorbed by the fuel in the core since some of the neutrons leaking upward from the core are scattered in nucleuses of structural materials such as Fe and absorbed by a fuel in the core when a coolant in the sodium plenum region is voided.

In a fast reactor such as a fast breeder reactor, it is required to keep a void reactivity within a certain range in consideration of safety. In JP-A-2016-085118, the void reactivity is reduced by reducing the volume ratio of the structural materials in the Na plenum region, but the effect may be limited depending on a structure of the fuel rod and a housed nuclear fuel material.

In a core where a sodium plenum region is installed, the void reactivity may be reduced reliably by changing a standby position of absorbers of control rods inserted in the sodium plenum region, which is not mentioned in JP-A-2016-085118.

SUMMARY OF THE INVENTION

Therefore, an object of the invention is to provide a core of a fast reactor including a sodium plenum installed above a core fuel, which is capable of reliably reducing a void reactivity, and an operation method thereof.

In order to solve the above problems, the invention provides a core of a fast reactor including a sodium plenum installed above a core fuel, in which a tip of a primary control rod is inserted in a core fuel region, and a tip of a backup control rod is arranged above an upper end of the core fuel region for operation.

In addition, the invention provides a method of operating a fast reactor including a sodium plenum installed above a core fuel, the method including inserting a tip of a primary control rod into a core fuel region, and arranging a tip of a backup control rod above an upper end of the core fuel region for operation.

According to the invention, the core of a fast reactor including the sodium plenum installed above the core fuel, which is capable of reliably reducing the void reactivity, and the operation method thereof can be realized.

Accordingly, the reliability of the fast reactor can be further improved.

Objects, configurations and effects other than those described above will be clarified by the description of the following embodiments.

DESCRIPTION OF THE PREFERRED EMBODIMENTS

Figure 1:
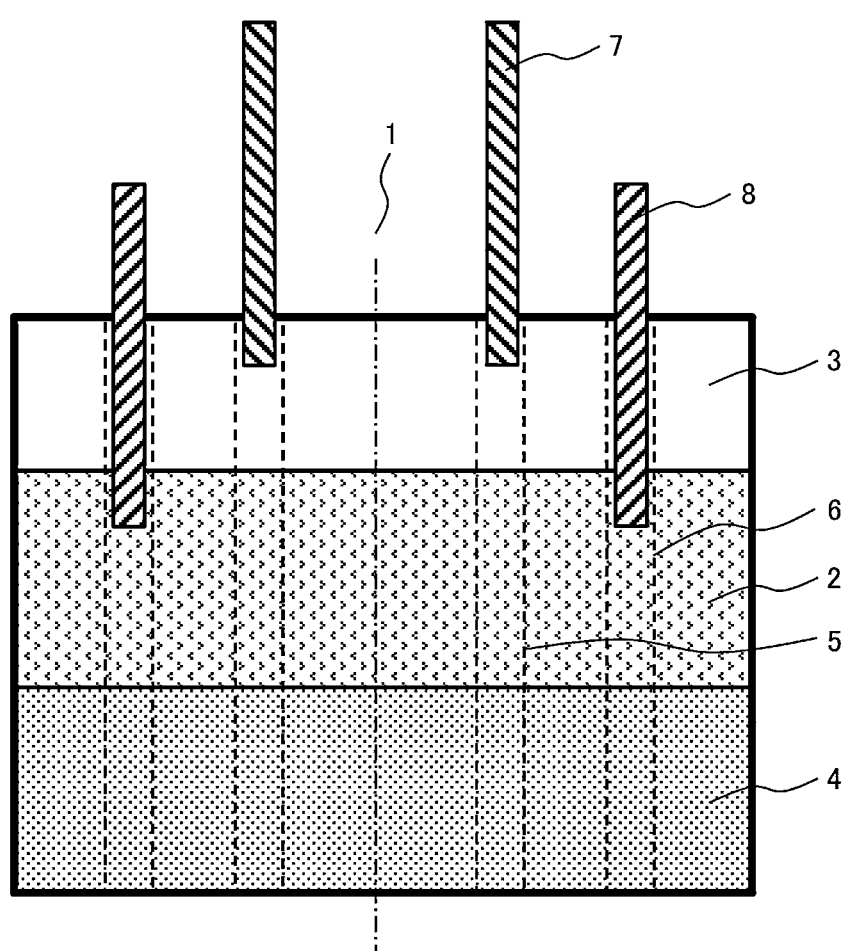
FIG. 1 is a diagram showing a vertical cross-sectional structure of a core and insertion positions of control rods according to an embodiment 1 of the invention.

Hereinafter, embodiments of the invention will be described with reference to the drawings. In the drawings, the same configurations are denoted by the same reference numerals, and a detailed description of the repeated parts will be omitted.

Embodiment 1

Figure 6:
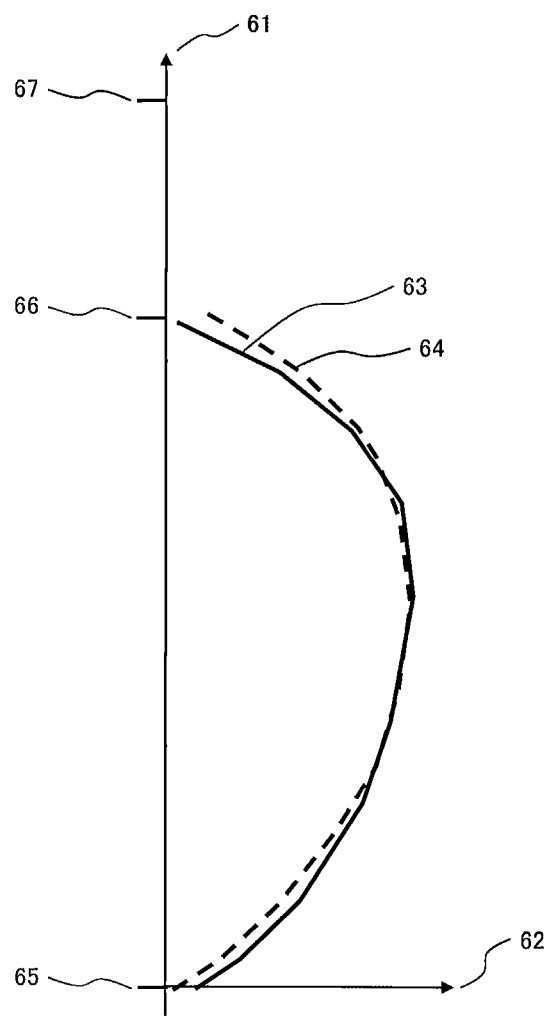
FIG. 6 is a diagram showing a core average neutron flux axial distribution.

A core of a fast reactor and an operation method thereof according to an embodiment 1 of the invention will be described with reference to FIGS. 1 and 6. FIG. 1 shows a vertical cross-sectional structure of the core and insertion positions of control rods according to the present embodiment. FIG. 6 shows a core average neutron flux axial distribution during a fast reactor operation.

As shown in FIG. 1, a core 1 of the fast reactor of the present embodiment has: a core fuel region 2 loaded with plutonium (Pu); a sodium plenum region 3 including a wrapper tube (not shown) and flowing sodium (Na) (not shown), including no fuel rod bundles, and installed above the core fuel region 2; and a gas plenum region 4 installed below the core fuel region 2 and for holding a gaseous fission product (FP) in a FP generated by a fuel fission.

In the present embodiment, a control rod assembly, in which a plurality of control rod elements containing pellets of boron carbide ($B_4C$) are bundled and which is housed in a stainless steel wrapper tube, and a control rod drive mechanism, which supports and controls the control rod assembly so as to be drivable on an upper portion of a reactor, are used to take in and out control rod guide pipes 5 and 6 from above the core fuel region 2, so as to control a reactivity of the core.

The control rods include control rods of two systems, and in the drawing, reference numeral 8 denotes a primary control rod (PCR) assembly, and reference numeral 6 denotes a guide pipe thereof. The PCR 8 has a function of controlling a burnup reactivity and a power density distribution associated with an operation of the fast reactor, and is used in a state where a tip thereof is inserted in the core fuel region 2 during the operation, as shown in FIG. 1.

Reference numeral 7 in the drawing denotes a backup control rod (BCR) assembly, which is inserted in the guide pipe denoted by reference numeral 5 until a tip thereof is exactly located at an upper end of the core fuel region 2 in the guide pipe 5 in a normal operation state in the related art.

In the present embodiment, as shown in FIG. 1, the tip of the BCR 7 is inserted in the sodium plenum region 3 above the core fuel region 2. An object of the invention is to improve safety during an anticipated transient without scram (ATWS), and since the control rods are not inserted in the core fuel region 2 during the most severe unprotected loss-of-flow (ULOF), even if the tip of the BCR 7 is above a tip position of the core fuel region 2, there is no influence on the ULOF.

FIG. 6 shows a core average neutron flux axial distribution the during the fast reactor operation. Reference numeral 61 denotes an axial coordinate (Z-axis) of the core 1, reference numeral 62 denotes a relative value of a core average neutron flux, reference numeral 65 denotes a lower end position of the core fuel region 2, reference numeral 66 denotes an upper end position of the core fuel region 2, and reference numeral 67 denotes an upper end position of the sodium plenum region 3. In addition, reference numeral 63 denotes a neutron flux axial distribution when the tip of the BCR 7 is inserted at the upper end position of the core fuel region 2, and reference numeral 64 denotes a neutron flux axial distribution when the tip of the BCR 7 is above the upper end position of the core fuel region 2.

From FIG. 6, it can be seen that an amount of a neutron flux on the upper end side of the core 1 increases by pulling the tip of the BCR 7 upward from the upper end of the core fuel region 2.

Accordingly, a density of sodium decreases during the ULOF, or when sodium boils, the amount of neutrons leaking in the direction of the Na plenum region 3 located above the core 1 increases, and thus a negative void reactivity in the sodium plenum region 3 becomes a more negative value, and the void reactivity of the entire core decreases.

Further, since a neutron absorption of the BCR 7 is reduced, a required Pu enrichment is reduced and the burnup reactivity is reduced. Therefore, the safety during unprotected transient of over power (UTOP) is also improved.

As described above, the fast reactor of the present embodiment is operated by inserting the tip of the primary control rod (PCR) 8 into the core fuel region 2 and arranging the tip of the backup control rod (BCR) 7 above the upper end of the core fuel region 2. In other words, the fast reactor is operated by arranging the tip of the backup control rod (BCR) 7 between the upper end of the core fuel region 2 and an upper end of the sodium plenum (Na plenum region 3).

Therefore, in the present embodiment, the safety is improved during the ULOF and UTOP.

Embodiment 2

Figure 2:
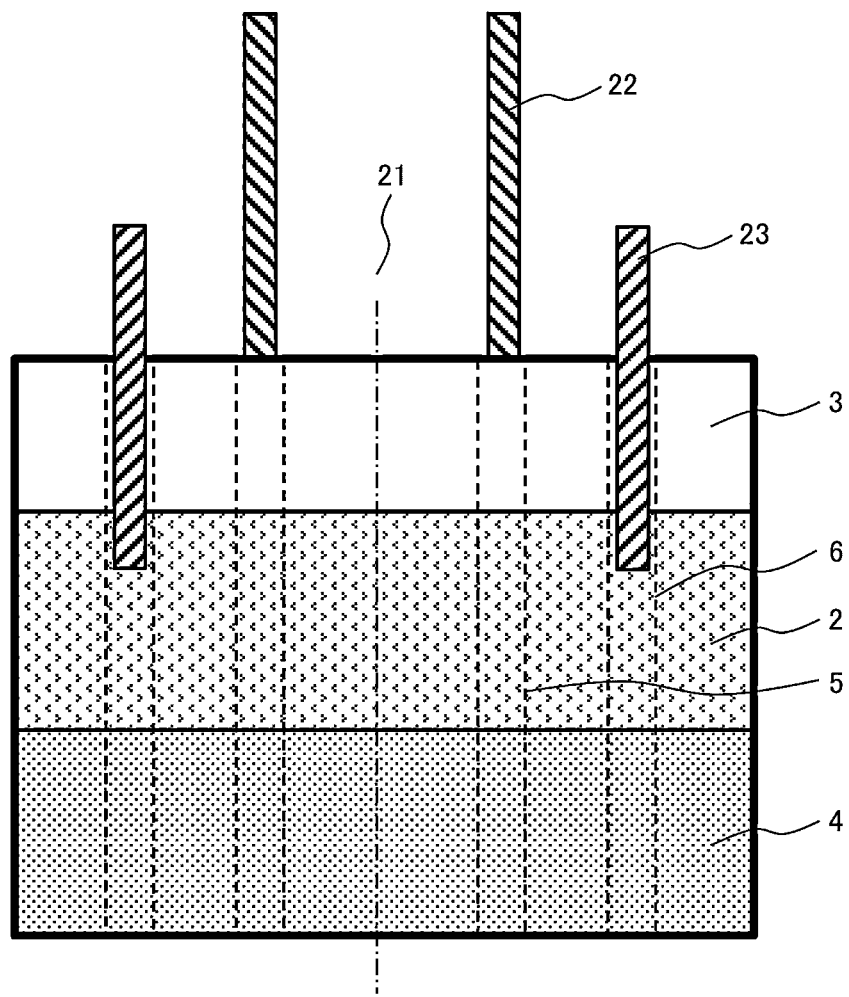
FIG. 2 is a diagram showing a vertical cross-sectional structure of a core and insertion positions of control rods according to an embodiment 2 of the invention.

A core of a fast reactor and an operation method thereof according to an embodiment 2 of the invention will be described with reference to FIG. 2. Reference numeral 21 in the drawing denotes the core of the fast reactor in the present embodiment. In the present embodiment, a tip of a backup control rod (BCR) 22 is exactly located at an upper end position of the Na plenum region 3.

As shown in the present embodiment (FIG. 2), when the tip of the BCR 22 is arranged at a position substantially same as the upper end position of the Na plenum region 3 during the fast reactor operation, the tip of the BCR 22 is farther from the upper end of the core fuel region 2 than the case in the embodiment 1 (FIG. 1), and a value of a core average neutron flux 64 at the upper end of the core fuel region 2 shown in FIG. 6 is larger. Therefore, the void reactivity can be made to a more negative side.

Embodiment 3

Figure 3:
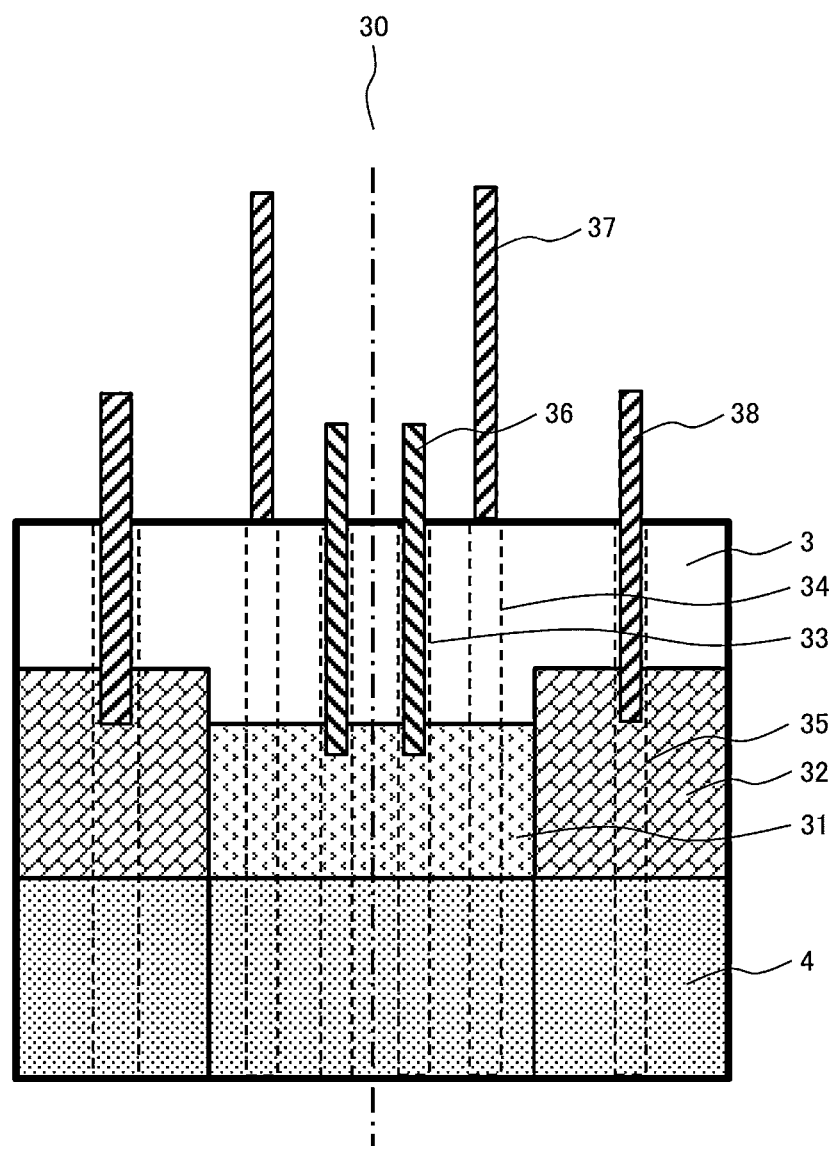
FIG. 3 is a diagram showing a vertical cross-sectional structure of a core and insertion positions of control rods according to an embodiment 3 of the invention.

A core of a fast reactor and an operation method thereof according to an embodiment 3 of the invention will be described with reference to FIGS. 3 to 5. In FIG. 3, reference numeral 30 denotes the core of the fast reactor in the present embodiment.

As shown in FIG. 3, in the present embodiment, a core fuel region includes two regions, an inner core fuel region 31 on a central side and an outer core fuel region 32 on a peripheral side in a radial direction of a core 30, and a height of the inner core fuel region 31 is lower than a height of the outer core fuel region 32 in an axial direction of the core 30. In addition, a height of the Na plenum region 3 (an axial length of the core 30) is high (long) in the inner core fuel region 31 and low (short) in the outer core fuel region 32. In the inner core fuel region 31, a primary control rod (PCR) 36 and a control rod guide pipe 33 thereof, and a backup control rod (BCR) 37 and a control rod guide pipe 34 thereof are installed.

In the present embodiment, the primary control rod (PCR) 36 of an inner core is inserted in an upper portion of the inner core fuel region 31, and the backup control rod (BCR) 37 of the inner core is pulled out to the upper end position of the Na plenum region 3. In addition, a primary control rod (PCR) 38 of an outer core is inserted in an upper portion of the outer core fuel region 32.

Figure 4:
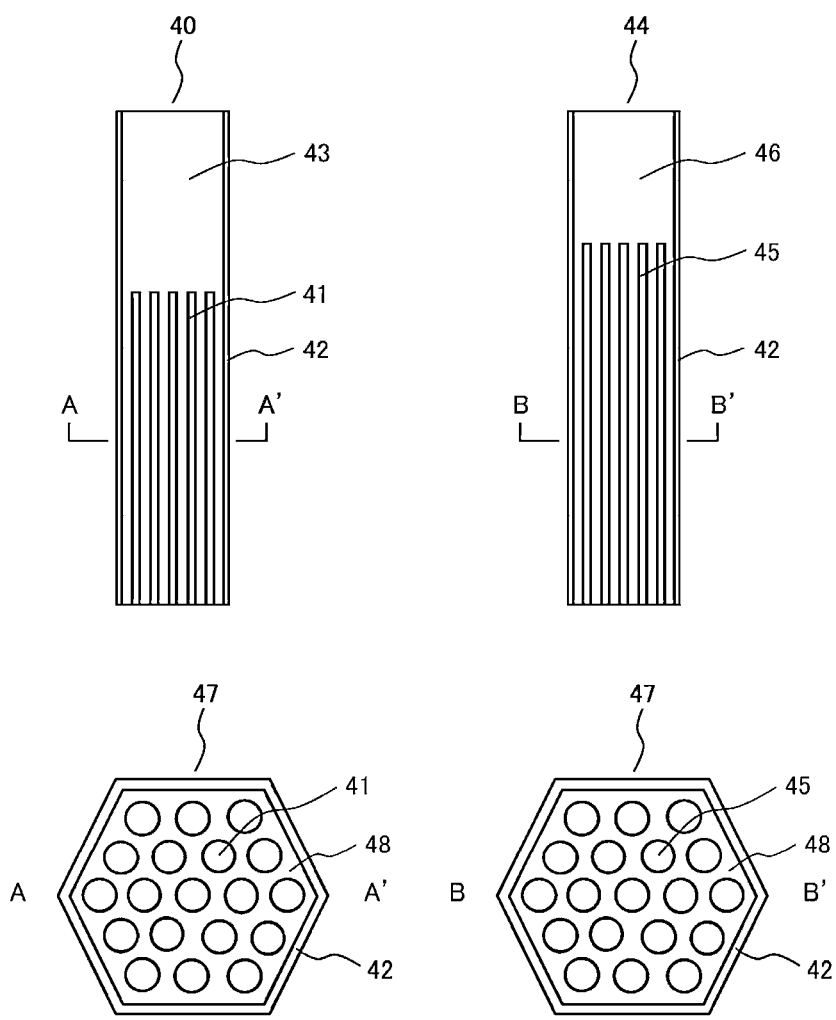
FIG. 4 is a diagram showing a cross-sectional structure of an inner core fuel assembly and an outer core fuel assembly according to the embodiment 3 of the invention.

FIG. 4 shows a structure of a core fuel assembly. Reference numeral 40 denotes a vertical cross-sectional view of an inner core fuel assembly loaded in the inner core fuel region 31 in FIG. 3. A fuel material is a MOX fuel containing Pu, and an inside of a wrapper tube 42 is provided with a plurality of inner core fuel rods 41 containing a pelletized fuel that is a mixture of an oxide of Pu or trans-uranium (TRU) and an oxide of depleted uranium (U-238). Although not shown in FIG. 4, a space between the inner core fuel rods 41 is held by a stainless steel wire spacer.

The wrapper tube 42 and a sodium plenum 43 containing only flowing sodium are provided above fuel rod bundles. As shown in a horizontal cross-sectional view (lower left figure in FIG. 4) in an A-A' cross section of an inner core fuel assembly 40, the wrapper tube 42 has a regular hex-agonal shape, and flowing sodium 48, which is a coolant, flows between the fuel rods inside the wrapper tube 42 from a lower side to an upper side in a vertical direction.

Reference numeral 44 denotes a vertical cross-sectional view of the outer core fuel assembly loaded in the outer core fuel region 32 in FIG. 3. A structure and a composition of a contained MOX fuel of each of outer core fuel rods 45 are the same as those of each of the inner core fuel rods 41, but the length of each of the outer core fuel rods 45 is longer than that of each of the inner core fuel rods 41. As a result, a height of a sodium plenum 46 of the outer core fuel assembly 44 (an axial length of the fuel assembly) is lower (shorter) than that of the sodium plenum 43 of the inner core fuel assembly 40. A horizontal cross-sectional view (lower right figure in FIG. 4) in a B-B' cross section of the outer core fuel assembly 44 has the same shape as a horizontal cross-sectional view 47 of the inner core fuel assembly 40.

Figure 5:
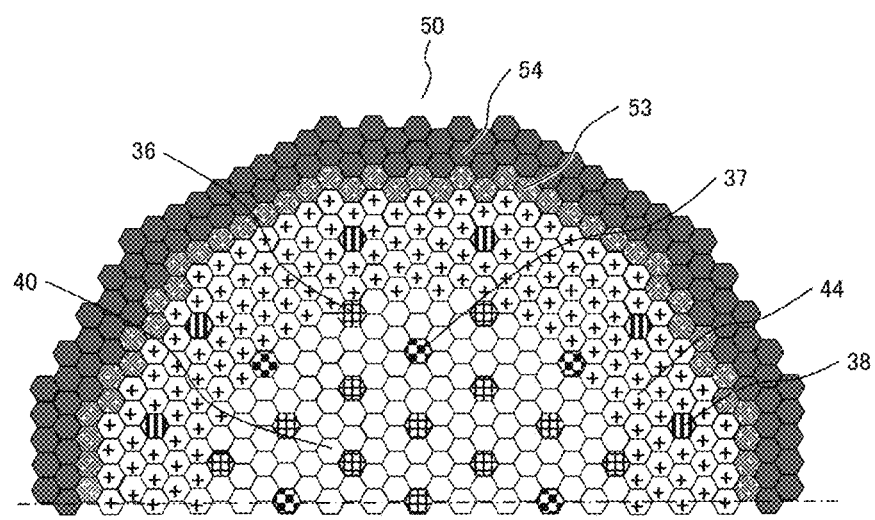
FIG. 5 is a diagram showing a horizontal cross-sectional structure of the core according to the embodiment 3 of the invention.

FIG. 5 shows a horizontal cross section of the core 30. FIG. 5 shows a half the horizontal cross section 50 of the core 30 (½ core). As mentioned above, the core fuel region includes two regions, that is, the inner core fuel region on the central side and the outer core fuel region arranged on the periphery thereof, and the inner core fuel region is loaded with the inner core fuel assemblies 40 having a lower core height, and the outer core fuel region is loaded with the outer core fuel assemblies 44 having a higher core height. Although not shown in FIG. 3, one row outside the outer core fuel region 32 is a radial blanket region, which is loaded with a radial blanket fuel assemblies 53, and two rows outside the one row are a shield region, which is loaded with a shield assemblies 54.

In addition, as mentioned above, the primary control rods (PCRs) 36 and the backup control rods (BCRs) 37 are arranged in the inner core fuel region, and the primary control rods (PCRs) 38 are arranged in the outer core fuel region.

In the present embodiment, the height of the inner core fuel region 31, which greatly contributes to the void reactivity, is lower than the height of the outer core fuel region 32 to make the void reactivity even smaller than that of the core of the fast reactor in the embodiment 2.

Embodiment 4

Figure 7:
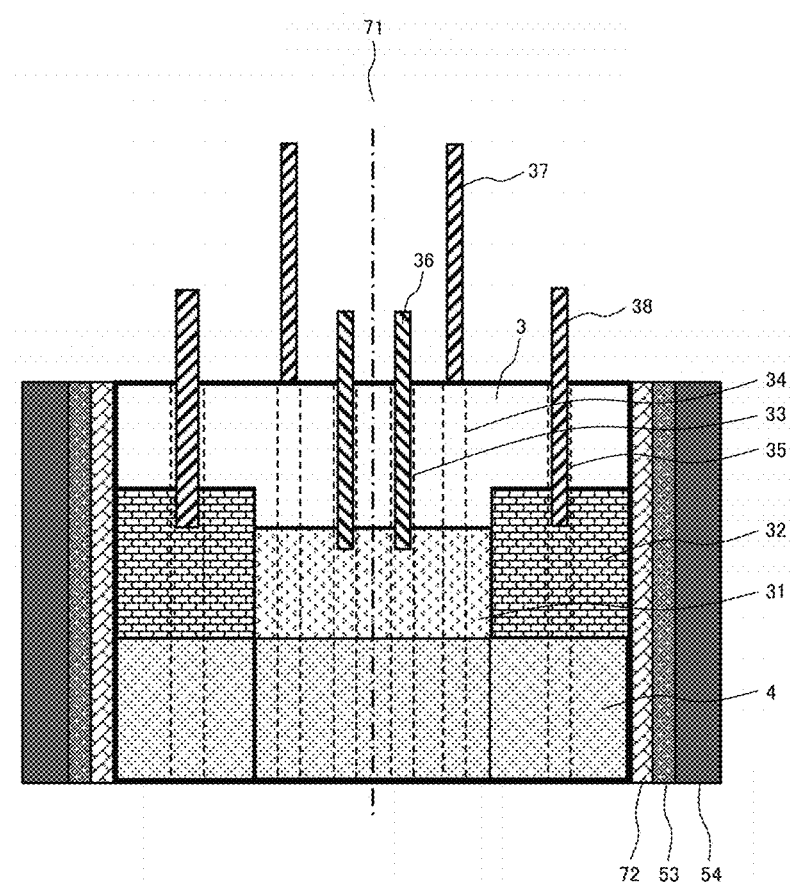
FIG. 7 is a diagram showing a vertical cross-sectional structure of a core and insertion positions of control rods according to an embodiment 4 of the invention.
Figure 8:
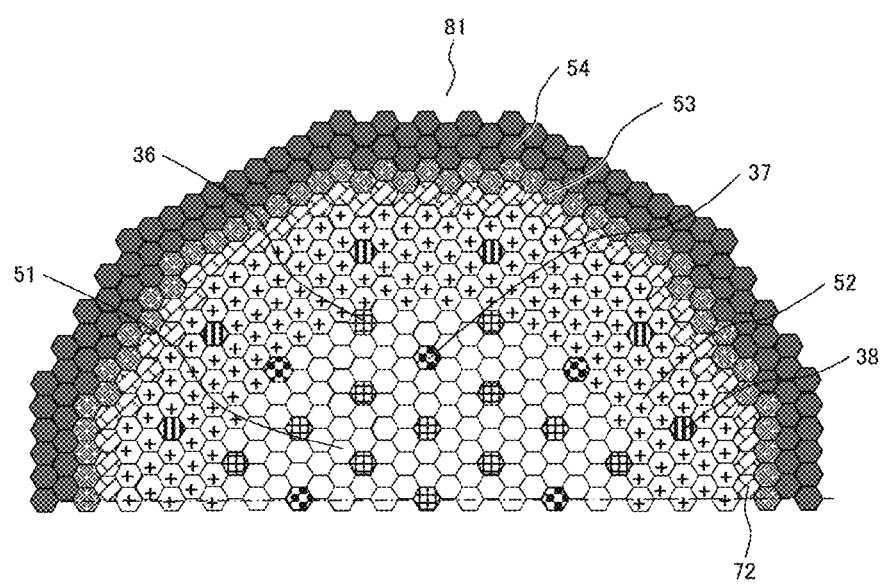
FIG. 8 is a diagram showing a horizontal cross-sectional structure of the core according to the embodiment 4 of the invention.

A core of a fast reactor and an operation method thereof according to an embodiment 4 of the invention will be described with reference to FIGS. 7 and 8. In FIG. 7, reference numeral 71 denotes the core of the fast reactor in the present embodiment. In FIG. 8, reference numeral 81 denotes a horizontal cross section of the core (½ core) of the fast reactor of the embodiment.

The present embodiment differs from the embodiment 3 shown in FIGS. 3 and 5 in that one row of gas expansion module (GEM) assembly 72 is arranged between the outer core fuel region 32 and a radial blanket region 53. The GEM assembly 72 has a structure that closes an upper portion of the wrapper tube of the core fuel assembly, and has an inflow hole for the coolant at a lower portion, argon (Ar) gas sealed at an inner side upper end, and a liquid level of the coolant sodium formed inside.

A static pressure at the inflow hole at a lower end of the GEM, a pressure loss at a bundle portion of the fuel assembly, and a pressure of an argon gas inside the GEM are balanced, and during a normal operation, the sodium liquid level inside the GEM is at an upper end of a sodium plenum.

In this state, sodium has a function as a reflector of neutrons, so the influence on the nuclear characteristics of the core is small.

When a primary pump stops and a coolant flow rate decreases during the ULOF, a pressure balance in the inflow hole at the lower end of the GEM changes due to a loss of a pump dynamic pressure, and the sodium liquid level inside the GEM drops to the lower end position of the core fuel region. Therefore, the amount of neutron leakage from the core fuel region to an outside in the radial direction increases, and a negative reactivity is inserted.

Therefore, by constructing as in the present embodiment, a net void reactivity of the entire core can be made negative by the negative reactivity of the sodium plenum region and the negative reactivity of the GEM assembly 72 during the ULOF, and the safety is dramatically improved.

As described above, according to the embodiments of the invention, in the core of the fast reactor including the sodium plenum, the neutron flux at the upper end of the core fuel is increased by pulling out only the backup control rod of the two system control rods to an upper portion of the sodium plenum, the neutron leakage from the core fuel to the sodium plenum is increased during a coolant voiding, and the void reactivity can be reduced. Further, since absorption of the neutrons due to the backup control rod is reduced, the required Pu enrichment can be reduced and the burnup reactivity can also be reduced.

The invention is not limited to the above-described embodiments, and includes various modifications. For example, the above embodiments have been described in detail for easy understanding of the invention, and are not necessarily limited to those including all the configurations described above. In addition, a part of a configuration of one embodiment can be replaced with a configuration of another embodiment, and a configuration of another embodiment can be added to a configuration of one embodiment. In addition, a part of the configuration of one embodiment may be added, deleted, or replaced with another configuration.

What is claimed is:

1. A core of a fast reactor including a sodium plenum installed above a core fuel, comprising:
   a core fuel region in which the core fuel is disposed;
   a sodium plenum region in which the sodium plenum is disposed;
   a primary control rod; and
   a backup control rod;
   wherein only a lower tip of the primary control rod is inserted into an upper end of the core fuel region in a normal operation state of the fast reactor, and
   in the sodium plenum region, in which the sodium plenum is disposed above an upper end of the core fuel region, only a central portion of the primary control rod above the lower tip of the primary control rod and only a lower tip of the backup control rod are arranged in the sodium plenum region in the normal operation state of the fast reactor,
   wherein the lower tip of the backup control rod is arranged at a position substantially same as an upper end of the sodium plenum for operation.

2. The core of a fast reactor according to claim 1, wherein in a radial direction of the core, the core fuel region has an inner core fuel region arranged on a center side and an outer core fuel region arranged around the inner core fuel region, and
   in an axial direction of the core, a length of a fuel rod of an inner core fuel assembly loaded in the inner core fuel region is shorter than that of a fuel rod of an outer core fuel assembly loaded in the outer core fuel region, and a length of the sodium plenum on the inner core fuel assembly is longer than that of the sodium plenum on the outer core fuel assembly.

3. The core of a fast reactor according to claim 2, wherein a radial blanket region radially outward of the outer core fuel region, and a shield region radially outward of the radial blanket region are provided.

4. The core of a fast reactor according to claim 3, wherein a gas expansion module assembly is provided between the outer core fuel region and the radial blanket region.

* * * * *